United States Patent [19]

Murata et al.

[11] Patent Number: 5,343,420
[45] Date of Patent: Aug. 30, 1994

[54] SIGNAL DISCRIMINATION CIRCUIT

[75] Inventors: Yasumoto Murata, Ikoma; Syuuichi Yoshikawa; Michio Ikeuchi, both of Nara, all of Japan

[73] Assignee: Sharp Kabushiki Kaisha, Osaka, Japan

[21] Appl. No.: 144,446

[22] Filed: Nov. 2, 1993

[30] Foreign Application Priority Data

Nov. 2, 1992 [JP] Japan ................................ 4-294618

[51] Int. Cl.$^5$ ........................ G06G 7/02; G06F 15/31
[52] U.S. Cl. .................................. 364/825; 364/724.01
[58] Field of Search .................. 364/825, 807, 724.01, 364/724.09, 724.19, 728.03

[56] References Cited

U.S. PATENT DOCUMENTS

| | | | |
|---|---|---|---|
| 4,587,620 | 5/1986 | Niimi et al. | 364/724.01 |
| 5,054,103 | 10/1991 | Yasuda et al. | 364/725 |
| 5,136,531 | 8/1992 | McCaslin | 364/724.19 |

FOREIGN PATENT DOCUMENTS 64-2462  6/1987  Japan .

Primary Examiner—Tan V. Mai

[57] ABSTRACT

A signal discrimination circuit is provided with: a prediction circuit for releasing a prediction signal that is formed by making a linear prediction based on a previous input signal; a differential operation circuit for calculating the difference between the input signal and the prediction signal so as to release a predicted remainder; and a decision circuit for determining whether or not the degree of the variation of the predicted remainder from the zero level is maintained within a predetermined range. Therefore, even if a sound signal having a time-wise correlation and white noise having no time-wise correlation possess wide frequency components respectively, both of the signals are discriminated by the decision circuit based on the difference in the correlation. Thus, the signal discrimination circuit ensures an accurate discrimination between a control signal for a facsimile containing white noise and a sound signal.

27 Claims, 4 Drawing Sheets

SIGNAL DISCRIMINATION CIRCUIT

FIELD OF THE INVENTION

The present invention relates to a signal discrimination circuit for use in a digital signal processing apparatus, such as a facsimile, a data communications terminal, etc., that is connected to an analog signal line such as a telephone line.

BACKGROUND OF THE INVENTION

A facsimile has a signal processing circuit for receiving a facsimile-use control signal that is sent through a telephone line, and also has a telephone set for receiving a sound signal through the same telephone line. Therefore, the facsimile is provided with a function that switches the telephone line automatically to connect an input signal to the telephone set when the input signal from the telephone line is a sound signal for a telephone call.

For this reason, the facsimile has a signal discrimination circuit for determining whether the input signal in question is a control signal for facsimile or a sound signal. Here, the control signal includes a calling tone (hereinafter, referred to as CNG signal) for calling the recipient or other signals. The circuit, for example, shown in FIG. 5 is known as such a signal discrimination circuit. In the signal discrimination circuit, an input signal, which has been amplified by an amplifier 11, is first filtered through band-pass filters 12 that have three kinds of frequency bands that are different from one another. Output signals from the respective band-pass filters 12 are subjected to waveform shaping in waveform shaping circuits 13. Then, the output signals are compared with respective threshold values in comparison circuits 14, and the presence or absence of a signal within each frequency band is detected through this comparison.

A control signal for facsimiles consists of a single tone having a single frequency that is determined for each control signal. For example, in the case of the CNG signal, a signal of 1100 Hz lasting for 0.5 sec. is sent at intervals of 3 seconds. Here, suppose that one of the frequency bands of the band-pass filters 12 is set to a frequency band of the single tone, while the other frequency bands of the band-pass filters 12 are set to frequency bands that are respectively higher and lower than the frequency band. If an input signal is a control signal, only the corresponding comparison circuit 14 detects the signal while the other two comparison circuits 14 do not detect the signal.

If an input signal is a sound signal, the signal is detected by all the comparison circuits 14 or a plurality of the comparison circuits 14 because the sound signal has comparatively wide frequency components. Therefore, a decision circuit 15 is installed in order to execute logical operations based on the results of the detection made by the comparison circuits 14, and it is determined whether a certain input signal is the control signal or the sound signal through the logical operations.

However, telephone lines tend to be affected by noise inclusions. Therefore, in the above-mentioned telephone line, white noise tends to enter the control signal of the facsimile. The white noise is a signal which is distributed in all the frequency bands.

Therefore, the signal discrimination circuit, upon receiving an input signal consisting of a control signal containing white noise, tends to fail in discriminating the control signal from the sound signal because the signal is detected by all the comparison circuits 14 or a plurality of the comparison circuits 14. For this reason, the signal discrimination circuit tends to make a misjudgement and switch the telephone line to the telephone set even in the case of receiving the control signal.

As described above, in the signal discrimination circuit, since it can not discriminate white noise from sound signals, there is a possibility that upon receiving an input signal consisting of a control signal containing white noise, it will make a misjudgement determining the signal as a sound signal; this raises a problem that is related to low reliability in operation.

Upon receiving a control signal consisting of a single tone, this problem makes it difficult to discriminate the control signal due to white noise contained therein. Therefore, this problem is not limited to facsimiles, and is commonly encountered in digital signal processing apparatuses such as data communications terminals that are connected to analog signal lines such as telephone lines.

SUMMARY OF THE INVENTION

It is an objective of the present invention to provide a signal discrimination circuit which discriminates a sound signal from white noise by utilizing the fact that sound signals have close correlation in time, and which improves reliability in discriminating between signals and noise.

In order to achieve the above objective, the signal discrimination circuit of the present invention is provided with: a prediction means for receiving input signals in succession, and for releasing a prediction signal that is formed by predicting an incoming input signal in a linear manner in accordance with a delay signal that is formed by delaying the input signal in a predetermined period of time; a differential operation means for receiving the input signal and the prediction signal related to the input signal in succession, and for calculating the difference between those signals so as to release a predicted remainder in succession; and a decision means for receiving the predicted remainder in succession and calculating variations between the predicted remainders, and for determining whether or not the degree of variation, which changes in response to a correlation between the input signals successively inputted therein, is maintained within a predetermined range.

With the above arrangement, the prediction means predicts an incoming input signal in a linear manner in accordance with the previous input signals that have been delayed, and successively releases a prediction signal in synchronism with the incoming input signal. Further, the differential operation means calculates the difference between the input signal and the prediction signal related thereto, and successively releases a predicted remainder that is the difference between both of the signals. Here, when the input signal and the prediction signal coincide with each other, the value of the difference is set to the zero level.

The decision means determines whether or not the degree of variation of each predicted remainder from the zero level is maintained within the predetermined range. In this case, if the input signal in question is a random signal such as white noise, no correlation is made between the previous input signals and the incoming input signal; this causes the predicted remainder to increase, thereby making the degree of variation become larger.

In contrast, if the input signal in question is a signal like a sound signal, which has its high energy portion distributed within comparatively low frequency bands and which successively changes in time, a close correlation is found between the previous input signals and the incoming input signal in proximate periods of time. Therefore, when a prediction is made in a linear manner in accordance with the previous input signals within the proximate periods of time as described above, a prediction signal that is close to the incoming input signal can be obtained accurately.

In other words, if the input signal has the close correlation, the predicted remainder that is a difference between the input signal and the prediction signal is distributed within a narrow range in the vicinity of the zero level. Conversely, if the input signal has only a small correlation as was described earlier, the predicted remainder that is a difference between the input signal and the prediction signal varies through a wide range.

Taking advantage of this fact, the decision means, if it determines that the degree of variation of a predicted remainder from the zero level is maintained within the predetermined range, makes a decision that the input signal in question is a sound signal or the like having the close correlation.

Further, the decision means, if it determines that the degree of variation of a predicted remainder from the zero level exceeds the predetermined range, makes a decision that the input signal in question is white noise or the like having no correlation.

In the mean time, in conventional signal discrimination circuits, band-pass filters for dividing an input signal into respective frequency bands are employed, and a discrimination is made between a sound signal and a single tone that is a control signal for a facsimile or other apparatuses by detecting the presence or absence of signals from the respective band-pass filters.

More specifically, if a signal is detected from a single band-pass filter, the input signal in question is determined to be a control signal, and if signals are detected from a plurality of the band-pass filters, the input signal in question is determined to be a sound signal.

Therefore, in the above signal discrimination circuit, if a random signal such as white noise or the like enters the input signal, the random signal causes signals to be detected from a plurality of the band-pass filters. This makes it difficult to discriminate a sound signal from the random signal, thereby often failing in discriminating between a control signal containing a random signal and a sound signal.

However, in the signal discrimination circuit of the present invention, by detecting the degree of correlation between an input signal and its prediction signal, it is possible to ensure accurate discrimination between a sound signal and white noise, which has not achieved by the conventional band-pass filters. Thus, the signal discrimination circuit discriminates between the control signal including a random signal such as white noise and the sound signal.

Additionally, the prediction means may be provided as a means for delaying an input signal for a given period of time, and for releasing a prediction signal that is obtained by multiplying the delayed signal by a prediction coefficient. Further, the prediction means may release a linear weighted sum as the prediction signal. The linear weighted sum is obtained as follows: an input signal is delayed for a plurality of periods of time that are different from one another; delayed signals thus obtained are multiplied by respective prediction coefficients, thereby producing delayed multiplication signals; and the delayed multiplication signals are added.

Moreover, a sampling means may be installed so that an input signal, which is an analog signal, is converted into a digital signal. The sampling means samples an input signal by means of oversampling wherein a high sampling frequency is used, and sampled values thus quantized are successively release for respective sampling points.

If such a sampling means is employed, the prediction means may release a linear weighted sum as a predicted sample value. The linear weighted sum are obtained as follows: previous sampled values sampled by the sampling means at two or more sampling points are multiplied by respective prediction coefficients; and the predicted sample values thus calculated are added.

Further, the prediction means may be provided as a means wherein a sampled value sampled by the sampling means is delayed for only one sampling period, and a predicted sample value obtained by multiplying the sampled value thus delayed by a prediction coefficient is released. Moreover, the differential pulse code modulation system (hereinafter, referred to as DPCM), wherein the prediction coefficient is set to, for example, one, may be adopted in the prediction means.

Taking advantage of a property that sound signals have close correlation between adjacent sampling points or proximate sampling points in terms of time, the DPCM system calculates differences by means of linear prediction, and encodes the differences. Thus, the DPCM system reduces the number of quantized bits, thereby compressing information with respect to the sound signals.

In the case of adopting the DPCM system in the prediction means, the signal discrimination circuit makes a decision as to whether an input signal is a signal such as a sound signal to which information compression utilizing the correlation is applicable or it is a signal such as white noise to which information compression utilizing the correlation is not applicable.

Moreover, the decision means may be provided as a means wherein a decision is made as to whether or not the absolute value of the predicted remainder calculated by the differential operation means exceeds a threshold value within a predetermined period of time.

However, in the arrangement wherein a decision is made that there is no correlation between the input signals even once the predicted remainder exceeds the threshold value, the threshold value should be set to a large value with a sufficient margin; this causes the decision accuracy to be reduced. Here, in order to improve the decision accuracy, the decision means may be arranged so that a decision is made based on the number of times the predicted remainder exceeds the threshold value in a predetermined period of time or based on a period of time during which the predicted remainder exceeds the threshold value.

Further, in the decision means, when the average value within a predetermined period of time in predicted remainders calculated by the differential operation means is set to the zero level, the dispersion of the predicted remainders is expressed by the arithmetical mean of values obtained by squaring the respective predicted remainders within the predetermined period of time, and this represents the average electrical energy of the respective predicted remainders.

Therefore, a decision may be made as to whether or not the degree of variation of each predicted remainder from the zero level is maintained within the predetermined range depending on whether or not the dispersion exceeds a threshold value. Even if the threshold value is set to a sufficiently small value, this arrangement makes it possible to ensure an accurate decision as to whether the input signal is a signal having close correlation such as a sound signal or it is a signal having no correlation such as white noise, thereby improving the decision accuracy on the input signals.

Consequently, the signal discrimination circuit ensures an accurate discrimination between a control signal containing a random signal such as white noise and a sound signal. Additionally, instead of the above dispersion, the standard deviation, which is the square root of the dispersion, may be utilized in the signal discrimination circuit; this arrangement also ensures an accurate decision on both of the signals.

For a fuller understanding of the nature and advantages of the invention, reference should be made to the ensuing detailed description taken in conjunction with the accompanying drawings.

DESCRIPTION OF THE EMBODIMENTS

Figure 2:
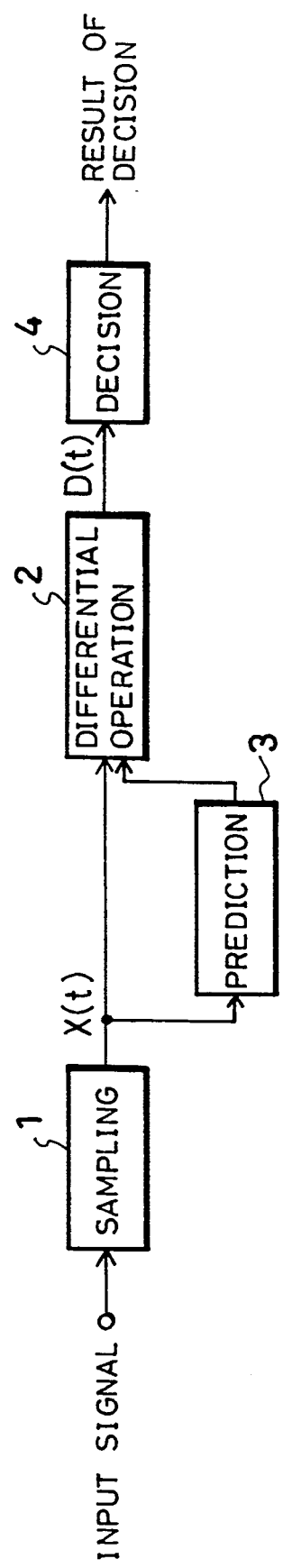
FIG. 2 is a block diagram showing the signal discrimination circuit schematically.

FIG. 2 is a block diagram showing a signal discrimination circuit of one embodiment of the present invention. As shown in FIG. 2, the signal discrimination circuit of the present invention is provided with a sampling circuit 1, a differential operation circuit 2, a prediction circuit 3, and a decision circuit 4, and input signals, which are inputted through a telephone line, are inputted to the sampling circuit 1.

In the sampling circuit 1, input signals are sampled in a predetermined cycle of time, and the subsequent sampled signals are quantized, and released as sampled values X(t). The sampled values X(t) released from the sampling circuit 1 are sent to the differential operation circuit 2, as they are, and also sent to the prediction circuit 3.

The prediction circuit 3 is a component that corresponds to an ADPCM prediction circuit 5 shown in FIG. 1, which will be described later. The prediction circuit 3 forms predicted sample values by predicting incoming sampled values X(t) in a linear manner in accordance with the previous sampled values X(t−k) released from the sampling circuit 1, and successively releases the corresponding predicted sample values for respective sampling points.

Figure 1:
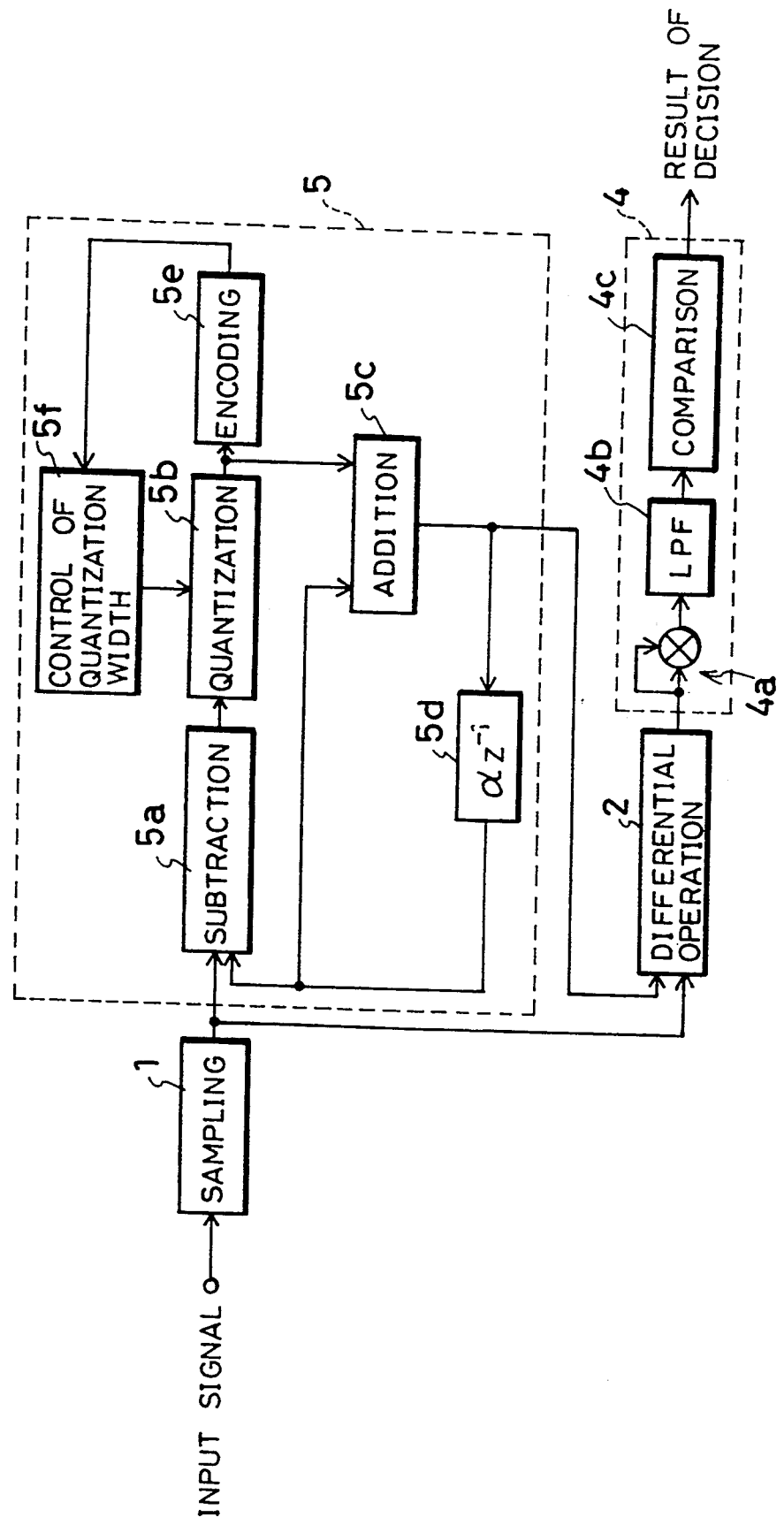
FIG. 1 is a block diagram showing one embodiment of a signal discrimination circuit of the present invention.

FIG. 1, which shows the above-mentioned embodiment more specifically, is a block diagram showing a configuration of the signal discrimination circuit.

As shown in FIG. 1, in the signal discrimination circuit, an input signal is supplied to the sampling circuit 1. The sampling circuit 1 samples the input signal in a cycle of time given by a predetermined sampling frequency, and quantizes the sampled signal in a predetermined quantization width. Here, the quantization width refers to a reference voltage which, if the signal is quantized by, for example, 16 steps, is obtained by dividing the voltage of the signal at the maximum amplitude by 16.

As for the sampling frequency, a frequency which is sufficient to oversample a frequency band wherein the high energy portion of a sound signal is distributed, is selected.

Generally, the sound signal has its high energy portion distributed within a low frequency band not more than 0.8 kHz; therefore, the sampling frequency of, for example, 8 kHz is sufficient to oversample the sound signal. Consequently, when the sampled values X(t) of the sound signal are formed using the above sampling frequency, and released by the sampling circuit 1, the sound signal, which successively changes in time, has close correlation between its adjacent sampled values or between its proximate sampled values.

The sampled values X(t) are sent to the differential operation circuit 2, and also sent to the ADPCM prediction circuit 5. In the ADPCM prediction circuit 5, the adaptive differential pulse code modulation system (hereinafter, referred to as ADPCM) is adopted. The ADPCM prediction circuit 5 forms predicted sample values by predicting incoming sampled values X(t) in a linear manner in accordance with the previous sampled values released from the sampling circuit 1, and successively releases the corresponding predicted sample values for respective sampling points.

In other words, in the ADPCM prediction circuit 5, which performs a primary linear prediction by the use of a circuit of the ADPCM system, the sampled values X(t) inputted are supplied to a subtraction circuit 5a, a quantization circuit 5b, an addition circuit 5c and a delayed multiplication circuit 5d, where respective predicted sample values are successively calculated and released.

More specifically, in the ADPCM prediction circuit 5, when the first sampled value is inputted to the subtraction circuit 5a, the output (ADPCM prediction value) of the delayed multiplication circuit 5d is still at the zero level; therefore, the sampled value is only adaptive controlled in its quantization width in the quantization circuit 5b, as will be described later, and sent to the delayed multiplication circuit 5d, as it is.

More specifically, the sampled value is sent from the subtraction circuit 5a to the addition circuit 5c as an ADPCM predicted remainder (second remainder value), which has the same value as the sampled value, and in the addition circuit 5c, the ADPCM predicted remainder is sent to the delayed multiplication circuit 5d as the predicted sample value having the unchanged value because the ADPCM prediction value is zero.

Successively, the delayed multiplication circuit 5d delays the predicted sample value by one sampling period, and this value is multiplied by a prediction coefficient α, and released as an ADPCM prediction value. Here, in the delayed multiplication circuit 5d, the prediction coefficient α is set to a predetermined value of, for example, one.

Thereafter, when the next sampled value is inputted to the subtraction circuit 5a, an operation is performed to find the difference between the sampled value and the ADPCM prediction value, and the result of the operation is released as a new ADPCM predicted remainder. The ADPCM predicted remainder is adaptive controlled in its quantization width by the quantization circuit 5b, and again added to the ADPCM prediction value in the addition circuit 5c. The added value of the ADPCM prediction value and the ADPCM predicted remainder is sent to the delayed multiplication circuit 5d as a new predicted sample value, and also released outside.

The output of the quantization circuit 5b is also sent to an encoding circuit 5e, where it is encoded, and then sent to a quantization width control circuit 5f. The quantization width control circuit 5f permits the quantization circuit 5b to adaptive control the quantization width in the manner as described above, by the use of the feed-back adaptive system (sequential adaptive system).

With this arrangement, an adaptive control is performed in such a manner that when the deviation of the ADPCM predicted remainder becomes large, the quantization width is set to be large and when the deviation of the ADPCM predicted remainder is small, the quantization width is set to be small. Therefore, it is possible to set the data-bit length indicating the ADPCM predicted remainder to a fixed length of 2 to 5 bits.

The differential operation circuit 2 performs an operation to find the difference between each sampled value X(t) and each of the aforementioned predicted sample values that have a timed relationship therewith, and releases a predicted remainder D(t)(first predicted remainder).

The decision circuit 4 is provided with a square-law circuit 4a, a low-pass filter 4b (hereinafter, referred to as LPF), and a comparison circuit 4c, and is arranged to determine the average energy of the predicted remainders D(t).

More specifically, when the sampling period of the sound signal is prolonged, it is assumed that the average value of the predicted remainders D(t) becomes zero because the predicted remainders D(t) show a normal distribution. Consequently, the predicted remainders D(t) are squared by the square-law circuit 4a to form positive remainder values all the time. When these remainder values are averaged by the smoothing operation in the LPF 4b, the output of the LPF 4b is virtually the same as the dispersion $\sigma^2$ of the predicted reminders D(t).

Therefore, by comparing the output of the LPF 4b with a threshold value in the comparison circuit 4c, it is possible to determine whether the input signal in question is a signal such as a sound signal having close correlation or it is a random signal such as white noise having little correlation. As a result, the signal discrimination circuit can determine whether the input signal in question is a control signal containing a random signal or it is a sound signal.

Figure 3:
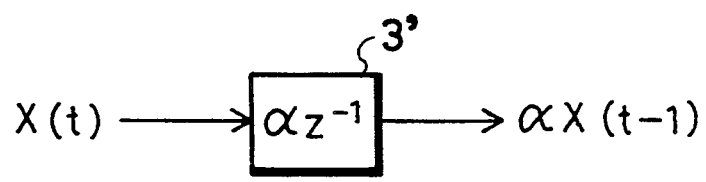
FIG. 3 is a block diagram showing a prediction circuit of another embodiment that is installed in the signal discrimination circuit of the present invention.
Figure 4:
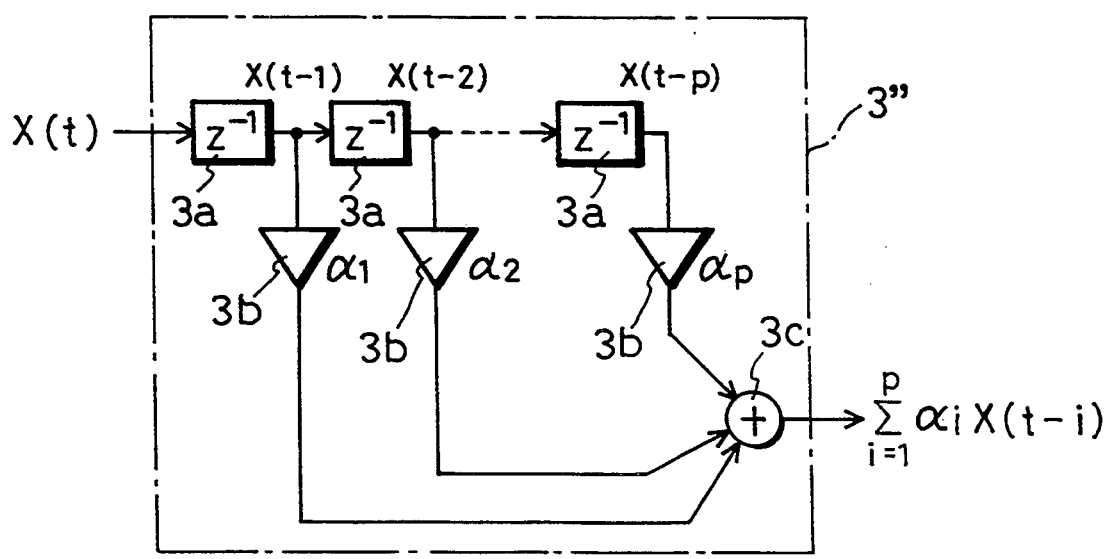
FIG. 4 is a block diagram showing a prediction circuit of still another embodiment that is installed in the signal discrimination circuit of the present invention.
Figure 5:
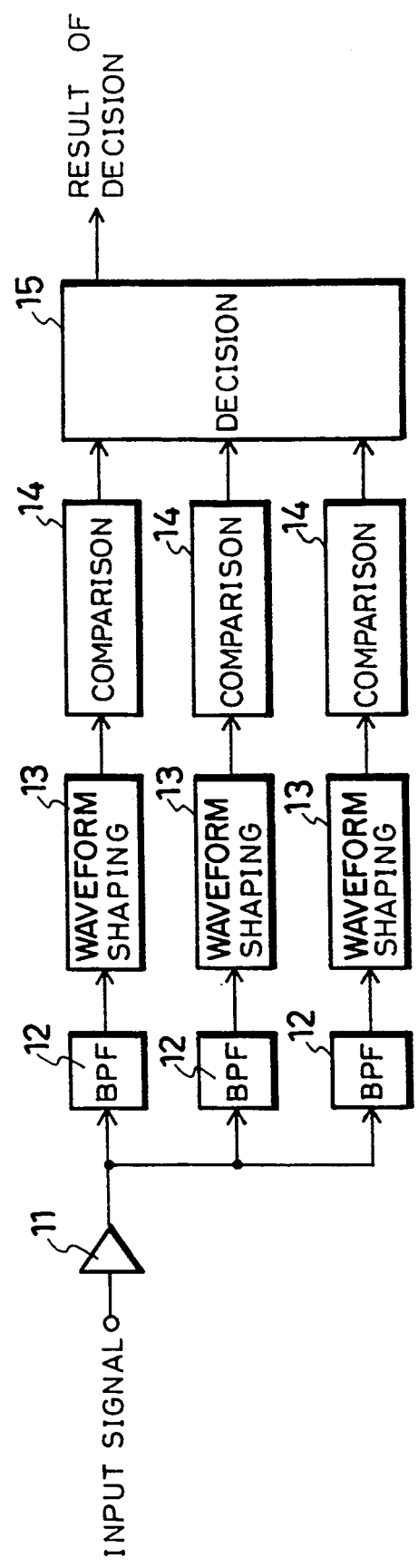
FIG. 5 is a block diagram showing a conventional signal discrimination circuit.

FIGS. 3 and 4 respectively show other embodiments of the signal discrimination circuit of the present invention: FIG. 3 is a block diagram showing another prediction circuit; and FIG. 4 is a block diagram showing still another prediction circuit. In these embodiments, the sampling circuit 1, the differential operation circuit 2 and the decision circuit 4 that are shown in FIG. 1 are employed in the same manner.

For example, as shown in FIG. 3, in a prediction circuit 3' which performs a primary linear prediction, an inputted sampled value is delayed by one sampling period, and is multiplied by a prediction coefficient α, for example, 1, and the subsequent value is released as a predicted sample value.

Further, as shown in FIG. 4, in a prediction circuit 3'' which performs a normal linear prediction, inputted sampled values are successively delayed by one sampling period by the use of a plurality of delay circuits 3a (the number of which is, for example, given by p), and the output values of the delay circuits 3a are multiplied by respective prediction coefficients $\alpha_i$ (where i is an integer from 1 to p) in multipliers 3b the number of which is given by p, so as to form respective delayed signals. Then, these delayed signals are added in an adder 3c, and the subsequent linear weighted sum is released as a predicted sample value.

Here, in the case of constructing the prediction circuit 3' and the prediction circuit 3'' by using digital circuits, the delay circuit 3a may be constructed by an FIFO memory circuit or a shift register which is synchronized with the sampling frequency.

The differential operation circuit 2 performs an operation to find the difference between each sampled value X(t) released from the sampling circuit 1 and each predicted sample value that is released from the prediction circuit 3, and releases a predicted remainder D(t). Therefore, in the case of performing the primary linear prediction by the use of the prediction circuit 3' as shogun in FIG. 3, the predicted remainder D(t) is represented by the following equation (1).

$$D(t) = X(t) - \alpha \cdot X(t-1) \tag{1}$$

In the case of performing the normal linear prediction by the use of the prediction circuit 3'' as shown in FIG. 4, the predicted remainder D(t) is represented by the following equation (2).

$$D(t) = X(t) - \sum_{i=1}^{p} \cdot \alpha \cdot X(t-i) \tag{2}$$

The predicted remainder D(t) released by the differential operation circuit 2 is sent to the decision circuit 4. The decision circuit 4 is a circuit for determining whether or not the degree of variation of the predicted remainder D(t) from the zero level is maintained within a predetermined range.

In other words, for example, the predicted remainder D(t) compared with positive and negative threshold values respectively in the comparison circuit 4c, and the decision circuit 4 performs logical operations on the cases where the predicted remainder D(t) goes not less than the positive threshold value or goes not more than the negative threshold value. Thus, the decision is easily made based on whether or not the number of cases where the result of the logical operation is true exceeds a predetermined number within a predetermined period of time. Here, the decision circuit 4 may calculates the absolute value of the prediction reminder D(t), and the absolute value may be compared with a threshold value.

Moreover, if the sampling period is prolonged to a certain degree, it is assumed that the average value of the predicted remainders D(t) becomes zero, as described earlier. Therefore, the decision circuit 4 may also identify the input signal based on whether or not the dispersion of the predicted remainders D(t) exceeds a threshold value. In this case, assuming that sampling is performed n times within a predetermined period of time, the dispersion $\sigma^2$ of the predicted remainders D(t) at this time is represented by the following equation (3).

$$\sigma = \frac{\sum_{i=0}^{n-1} \{D(t+i) - 0\}^2}{n} = \frac{\sum_{i=0}^{n-1} D^2(t+i)}{n} \quad (3)$$

The above-mentioned $\sigma^2$ is the arithmetical mean of values obtained by squaring the respective predicted remainders D(t), and this represents the average electrical energy of the respective predicted remainders D(t)(that is, power of the predicted remainder D(t)).

Next, the following description will discuss the operation of the signal discrimination circuit having the above-mentioned construction.

When the sampling circuit 1 samples an input signal by using a sampling frequency of 8 kHz, no correlation is made between sampled values located at proximate sampling points in the case where the input signal is a random signal such as white noise. In contrast, in the case of a sound signal, a close correlation is found between these sampled values because the sound signal has its high energy portion distributed within a low frequency band ranging not more than 0.8 kHz and because it is sequential in time, as described earlier.

Therefore, when the differential operation circuit 2 performs an operation to find the difference between the sampled value and a predicted sample value that has been predicted in the prediction circuit 3 in a linear manner, the subsequent predicted reminder D(t) of the operation is distributed within a virtually narrow range in the vicinity of the zero level in the case where the sampled values of the input signal have a close correlation. Conversely, in the case where the sampled values of the input signal show no correlation, the predicted remainder D(t) disperses in a wide range.

When the decision circuit 4 determines that the degree of variation, or dispersion, of predicted remainders D(t) from the zero level is maintained within the predetermined range, a judgement is made that the input signal is a sound signal or the like. Conversely, when the decision circuit 4 determines that the degree of variation of predicted remainders D(t) from the zero level exceeds the predetermined range, a judgement is made that the input signal is a random signal such as white noise.

Thus, the signal discrimination circuit is capable of identifying the type of the input signal by checking to see the degree of correlation between proximate sampled values in time in the input signal. This arrangement makes it possible to ensure an accurate discrimination between a sound signal having wide frequency components and a signal such as white noise. Therefore, the signal discrimination circuit accurately discriminates a sound signal from a control signal containing a signal such as white noise.

Consequently, the signal discrimination circuit, when applied to a facsimile or a data communications terminal connected to an analog signal line such as a telephone line, is able to discriminate whether the input signal is a control signal or a sound signal quickly and accurately.

Additionally, in the ADPCM prediction circuit 5 of the signal discrimination circuit, the explanation was given by exemplifying the ADPCM system wherein the single delayed multiplication circuit 5d is employed; yet, another ADPCM system, such as CCITT Recommendation, G721, wherein a plurality of delayed multiplication circuits are employed as a prediction device.

Moreover, in the signal discrimination circuit, the explanation was given by exemplifying the sampling circuit 1 which is used for sampling, quantizing and encoding the input signal; yet, without using the sampling circuit 1, it is possible to perform the above discrimination by applying analog processing to the input signal.

More specifically, a delayed signal formed by delaying the input signal for a predetermined period of time is multiplied by a prediction coefficient $\alpha$ so as to form a prediction signal. Then, a prediction remainder is obtained by subtraction of the input signal and the corresponding prediction signal, and a decision is made as to the distribution of the prediction remainders. Thus, the signal discrimination circuit accurately discriminates a sound signal from a control signal containing a signal such as white noise by detecting the degree of the distribution.

Furthermore, in the signal discrimination circuit, the explanation was given by exemplifying the case where the prediction coefficient $\alpha$ was set to, for example, 1; yet, the present invention is not limited to the arrangement. The prediction coefficient $\alpha$ may be given as a variable value so that the linear prediction is made more accurately as to the sampled values X(t) having a close correlation in time. Thus, the signal discrimination circuit discriminates a sound signal from a control signal containing a signal such as white noise more accurately by setting the threshold value to a smaller value.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A signal discrimination circuit comprising:
   prediction means for receiving input signals in succession, and for releasing a prediction signal that is formed by predicting an incoming input signal based on a delay signal that is formed by delaying the input signal in a predetermined period of time;
   differential operation means for receiving the input signal and the prediction signal related to the input signal in succession, and for calculating the difference between those signals so as to release a predicted remainder in succession; and
   decision means for receiving the predicted remainder in succession and calculating variations between the predicted remainders, and for determining whether or not the degree of variation, which changes in response to a correlation between the input signals successively inputted therein, is maintained within a predetermined range.

2. The signal discrimination circuit as defined in claim 1, wherein the prediction means comprises a prediction circuit for generating a delayed signal that is formed by delaying the input signal by a predetermined period of time, and for releasing a prediction signal that is formed by multiplying the delayed signal by a prediction coefficient.

3. The signal discrimination circuit as defined in claim 2, wherein the decision means comprises a decision circuit which determines whether or not the degree of variation of the predicted remainder from a zero level is maintained within a predetermined range depending on whether or not the absolute value of the predicted remainder calculated by the differential operation means exceeds a threshold value within a predetermined period of time.

4. The signal discrimination circuit as defined in claim 2, wherein the decision means comprises a decision circuit which determines whether or not the degree of variation of the predicted remainder from a zero level is maintained within a predetermined range depending on whether or not a dispersion or a standard deviation of the predicted remainders exceeds a threshold value when the average value of the predicted remainders is zero within a predetermined period of time.

5. The signal discrimination circuit as defined in claim 1, wherein the prediction means comprises a prediction circuit for generating delayed signals obtained by delaying the input signal by a plurality of different periods of time, for further generating delayed multiplication signals obtained by multiplying the delayed signals by prediction coefficients respectively, and for releasing a prediction signal formed as a linear weighted sum obtained by adding the respective delayed multiplication signals.

6. The signal discrimination circuit as defined in claim 5, wherein the decision means comprises a decision circuit which determines whether or not the degree of variation of the predicted remainder from a zero level is maintained within a predetermined range depending on whether or not the absolute value of the predicted remainder calculated by the differential operation means exceeds a threshold value within a predetermined period of time.

7. The signal discrimination circuit as defined in claim 5, wherein the decision means comprises a decision circuit which determines whether or not the degree of variation of the predicted remainder is maintained within a predetermined range depending on whether or not a dispersion or a standard deviation of the predicted remainders exceeds a threshold value when the average value of the predicted remainders is zero within a predetermined period of time.

8. The signal discrimination circuit as defined in claim 1, wherein the decision means comprises a decision circuit which determines whether or not the degree of variation of the predicted remainder is maintained within a predetermined range depending on whether or not the absolute value of the predicted remainder from a zero level calculated by the differential operation means exceeds a threshold value within a predetermined period of time.

9. The signal discrimination circuit as defined in claim 1, wherein the decision means comprises a decision circuit which determines whether or not the degree of variation of the predicted remainder is maintained within a predetermined range depending on whether or not a dispersion or a standard deviation of the predicted remainders exceeds a threshold value when the average value of the predicted remainders is zero within a predetermined period of time.

10. The signal discrimination circuit as defined in claim 1, wherein the decision means comprises a decision circuit which compares the absolute value of the predicted remainder calculated by the differential operation means and a threshold value so as to calculate the number of times the predicted remainder exceeds the threshold value in a predetermined period of time, and determines whether or not the degree of variation of the predicted remainder from a zero level is maintained within a predetermined range depending on whether or not the number of times exceeds a predetermined value.

11. The signal discrimination circuit as defined in claim 1, wherein the decision means comprises a decision circuit which compares the absolute value of the predicted remainder calculated by the differential operation means and a threshold value so as to calculate a period of time during which the predicted remainder exceeds the threshold value, and determines whether or not the degree of variation of the predicted remainder from a zero level is maintained within a predetermined range depending on whether or not the period exceeds a predetermined period of time.

12. The signal discrimination circuit as defined in claim 1, wherein the decision means comprises a decision circuit which determines whether or not the degree of variation of the predicted remainder from a zero level is maintained within a predetermined range depending on whether or not a dispersion or a standard deviation of the predicted remainders exceeds a threshold value when the average value of the predicted remainders is zero within a predetermined period of time, the decision circuit being arranged to determine that the input signal is a first signal having a close correlation in time such as a sound signal when the dispersion or the standard deviation is situated within the threshold value, and that the input signal is a second signal having no correlation in time such as white noise when the dispersion or the standard deviation exceeds the threshold value.

13. A signal discrimination circuit comprising:
sampling means for receiving an input signal, for sampling the input signal at predetermined intervals, and for releasing a sampling signal that has been quantized;
prediction means for receiving the sampling signal in succession, and for releasing a predicted sapling signal that has been formed by predicting an incoming input signal based on the previous sampling signal; and
differential operation means for receiving the input signal and the predicted sampling signal in succession, and for calculating the difference between those signals so as to release a predicted remainder in succession; and
decision means for receiving the predicted remainder in succession and calculating variations between the predicted remainders, and for determining whether or not the degree of the variation, which changes in response to a correlation between the input signals successively inputted therein, is maintained within a predetermined range.

14. The signal discrimination circuit as defined in claim 13, wherein the prediction mean comprises a prediction circuit for generating a delayed signal that is formed by delaying the sampling signal by only one sampling period, and for releasing a predicted sampling signal that is formed by multiplying the delayed signal by a prediction coefficient.

15. The signal discrimination circuit as defined in claim 14, wherein the decision means comprises a decision circuit which determines whether or not the degree of variation of the predicted remainder from a zero level is maintained within a predetermined range depending on whether or not the absolute value of the predicted remainder calculated by the differential operation means exceeds a threshold value within a predetermined period of time.

16. The signal discrimination circuit as defined in claim 14, wherein the decision means comprises a decision circuit which determines whether or not the degree of variation of the predicted remainder from a zero level is maintained within a predetermined range depending on whether or not a dispersion or a standard deviation of the predicted remainders exceeds a threshold value when the average value of the predicted remainders is zero within a predetermined period of time.

17. The signal discrimination circuit as defined in claim 13, wherein the prediction means comprises a prediction circuit for generating multiplication signals by multiplying the previous sampling signals at two or more sampling points by respective prediction coefficients, and releasing the predicted sampling signal in the form of a linear weighted sum obtained by adding the multiplication signals.

18. The signal discrimination circuit as defined in claim 17, wherein the decision means comprises a decision circuit which determines whether or not the degree of variation of the predicted remainder from a zero level is maintained within a predetermined range depending on whether or not the absolute value of the predicted remainder calculated by the differential operation means exceeds a threshold value within a predetermined period of time.

19. The signal discrimination circuit as defined in claim 17, wherein the decision means comprises a decision circuit which determines whether or not the degree of variation of the predicted remainder is maintained within a predetermined range depending on whether or not a dispersion or a standard deviation of the predicted remainders exceeds a threshold value when the average value of the predicted remainders is zero within a predetermined period of time.

20. The signal discrimination circuit as defined in claim 13, wherein the decision means comprises a decision circuit which determines whether or not the degree of variation of the predicted remainder from a zero level is maintained within a predetermined range depending on whether or not the absolute value of the predicted remainder calculated by the differential operation means exceeds a threshold value within a predetermined period of time.

21. The signal discrimination circuit as defined in claim 13, wherein the decision means comprises a decision circuit which determines whether or not the degree of variation of the predicted remainder from a zero level is maintained within a predetermined range depending on whether or not a dispersion or a standard deviation of the predicted remainders exceeds a threshold value when the average value of the predicted remainders is zero within a predetermined period of time.

22. A signal discrimination circuit comprising:
sampling means for receiving an input signal, for sampling the input signal at predetermined intervals, and for releasing a sampled value that has been quantized;
prediction means for receiving the sampled value in succession, and for releasing a predicted sample value that has been formed by predicting an incoming sampled value based on the previous sampling signal;
differential operation means for receiving the sampled value and the predicted sampled value, and for calculating the difference between those values so as to release a first predicted remainder; and
decision means for receiving the first predicted remainder, and for determining whether or not the degree of the variation of the first predicted remainders is maintained within a predetermined range,
wherein the prediction means includes a subtraction circuit, an addition circuit and a delayed multiplication circuit, the subtraction circuit being arranged to release a second predicted remainder that is obtained by subtracting a prediction value released from the delayed multiplication circuit from the sampled value, the addition circuit being arranged to release the predicted sample value obtained by adding the prediction value to the second predicted remainder, the delayed multiplication circuit being arranged to release a new prediction value to the subtraction circuit and the addition circuit, the new prediction value being obtained by delaying the predicted sample value by one sampling period and multiplying the resulting value by a prediction coefficient $\alpha$.

23. The signal discrimination circuit defined in claim 22, wherein the prediction coefficient $\alpha$ is set to a predetermined value.

24. The signal discrimination circuit defined in claim 23, wherein the prediction coefficient $\alpha$ is set to one.

25. The signal discrimination circuit defined in claim 22, wherein the prediction means includes a quantization circuit for adaptive quantizing the second predicted remainder and releasing the quantized predicted remainder to the addition circuit, the second predicted remainder being adaptive controlled in a quantization width thereof by the quantization circuit in response to the size of the second predicted remainder.

26. The signal discrimination circuit defined in claim 22, wherein the decision means includes a square-law circuit, a low-pass filter and a comparison circuit, the square-law circuit being arranged to release a positive remainder value by squaring the first predicted remainder inputted therein, the low-pass filter being arranged to release an average value signal obtained by smoothing the positive remainder values, the comparison circuit being arranged to identify the input signal depending on whether or not the average value signal exceeds a predetermined threshold value.

27. The signal discrimination circuit defined in claim 22, wherein the decision means includes a square-law circuit, a low-pass filter and a comparison circuit, the square-law circuit being arranged to release a positive remainder value by squaring the first predicted remainder inputted therein, the low-pass filter being arranged to release an average value signal obtained by smoothing the positive remainder values, the comparison circuit being arranged to determine that the input signal is a first signal such as a sound signal which varies continuously in time when the average value signal is smaller than a predetermined threshold value, and that the input signal is a second signal such as white noise which varies incontinuously in time when the average value signal exceeds the threshold value.

* * * * *